(12) United States Patent
Baaso et al.

(10) Patent No.: US 10,520,075 B2
(45) Date of Patent: Dec. 31, 2019

(54) APPARATUS FOR CONTROLLING THE TEMPERATURE OF AN OIL COOLER IN A MOTOR VEHICLE

(71) Applicant: Mahle International GmbH, Stuttgart (DE)

(72) Inventors: Michael Baaso, Sterling Heights, MI (US); Abhijit Deshmukh, Dhankawadi (IN); Antonio Spadafora, Tecumeseh (CA); Anton Swistak, Berkley, MI (US); Michael Traster, Brighton, MI (US); Vincent Ursini, Clinton Township, MI (US)

(73) Assignee: Mahle International GmbH (DE)

( * ) Notice: Subject to any disclaimer, the term of this patent is extended or adjusted under 35 U.S.C. 154(b) by 101 days.

(21) Appl. No.: 15/610,602

(22) Filed: May 31, 2017

(65) Prior Publication Data
US 2018/0347686 A1 Dec. 6, 2018

(51) Int. Cl.
*F16H 57/04* (2010.01)
*F01M 5/00* (2006.01)
(Continued)

(52) U.S. Cl.
CPC ......... *F16H 57/0413* (2013.01); *F01M 5/007* (2013.01); *F16N 39/02* (2013.01);
(Continued)

(58) Field of Classification Search
CPC .... F16H 57/0413; F01M 5/007; F01M 5/005; G05D 23/1366; F01P 2007/146; F01P 2025/08; F01P 2025/40; F01P 2060/04;
F01P 7/16; F01P 7/165; F01P 11/0295; F01P 2003/2214; F01P 2060/14; F01P 7/00; F01P 7/02; F01P 7/14
(Continued)

(56) References Cited

U.S. PATENT DOCUMENTS 2,423,398 A * 7/1947 Forrest ................... F01M 5/007
236/34.5
2,433,451 A * 12/1947 Green .................... F01M 5/007
236/35.2
(Continued)

FOREIGN PATENT DOCUMENTS

DE 1046195 B 12/1958
DE 10019029 A1 10/2001

*Primary Examiner* — David Hamaoui
*Assistant Examiner* — John D Bailey
(74) *Attorney, Agent, or Firm* — Fishman Stewart PLLC

(57) ABSTRACT

An apparatus for controlling the temperature of an oil cooler in a motor vehicle may include a temperature control arrangement. The temperature control arrangement may have a cold thermostat with a limit operating temperature and a warm thermostat with a lower limit operating temperature, the warm thermostat being connected in a fluid-connecting manner to the cold thermostat. The temperature control arrangement may also include a cold inlet for a coolant at a first temperature and a warm inlet for a coolant at a second temperature, the first temperature being lower than the second temperature. The temperature control arrangement may further include a coolant outlet fixable in a fluid-conducting manner to a coolant inlet of the oil cooler.

18 Claims, 5 Drawing Sheets

(51) Int. Cl.
*F16N 39/02* (2006.01)
*G05D 23/13* (2006.01)

(52) U.S. Cl.
CPC ..... *G05D 23/1366* (2013.01); *G05D 23/1373* (2013.01); *F01M 5/005* (2013.01); *F01P 2060/02* (2013.01)

(58) Field of Classification Search
USPC .............................................. 123/41.08, 41.1
See application file for complete search history.

(56) References Cited

U.S. PATENT DOCUMENTS

| | | | | |
|---|---|---|---|---|
| 3,329,340 | A * | 7/1967 | Lipscombe | G05D 23/1333 236/34.5 |
| 4,520,767 | A * | 6/1985 | Roettgen | F01P 3/20 123/41.1 |
| 5,647,315 | A * | 7/1997 | Saito | F01M 11/0004 123/195 C |
| 5,960,872 | A * | 10/1999 | Huemer | F01M 5/007 123/196 AB |
| 6,065,682 | A * | 5/2000 | Frunzetti | F01P 7/16 236/12.15 |
| 6,182,749 | B1 * | 2/2001 | Brost | F01M 5/007 123/196 AB |
| 6,196,168 | B1 * | 3/2001 | Eckerskorn | F01P 3/20 123/41.33 |
| 6,401,670 | B2 * | 6/2002 | Frunzetti | F01M 5/007 123/41.31 |
| 7,069,880 | B2 * | 7/2006 | Hutchins | F01P 7/165 123/41.29 |
| 7,267,084 | B2 * | 9/2007 | Lutze | F01P 3/20 123/41.02 |
| 7,406,929 | B2 * | 8/2008 | Hassdenteufel | F01P 3/20 123/41.1 |
| 7,748,442 | B2 * | 7/2010 | Kalbacher | F01M 5/002 165/166 |
| 8,522,537 | B2 * | 9/2013 | Lee | F01M 5/001 60/298 |
| 8,893,669 | B2 * | 11/2014 | Mehring | F01P 3/02 123/196 R |
| 9,903,674 | B2 * | 2/2018 | Kim | F16K 31/002 |
| 9,945,623 | B2 * | 4/2018 | Sheppard | F28F 27/00 |
| 10,060,326 | B2 * | 8/2018 | Kanzaka | F01P 3/02 |
| 10,087,793 | B2 * | 10/2018 | Boyer | F01M 5/005 |
| 2001/0010210 | A1 * | 8/2001 | Chamot | F01P 7/167 123/41.1 |
| 2005/0161519 | A1 * | 7/2005 | Kalbacher | F01M 5/007 236/34.5 |
| 2005/0205236 | A1 * | 9/2005 | Kalbacher | F01M 5/002 165/11.1 |
| 2006/0157000 | A1 * | 7/2006 | Lutze | F01P 3/20 123/41.02 |
| 2009/0101312 | A1 * | 4/2009 | Gooden | F16H 57/0413 165/104.19 |
| 2013/0153475 | A1 * | 6/2013 | Jainek | B01D 35/147 210/149 |
| 2013/0255604 | A1 * | 10/2013 | Rollinger | F01P 7/048 123/41.15 |
| 2013/0255605 | A1 * | 10/2013 | Jentz | F01P 11/16 123/41.15 |
| 2016/0258341 | A1 * | 9/2016 | Yoon | F01P 7/16 |
| 2017/0030456 | A1 * | 2/2017 | Zou | F01M 5/007 |
| 2017/0114700 | A1 * | 4/2017 | Maki | F01P 3/02 |
| 2018/0010866 | A1 * | 1/2018 | Sheppard | F16K 31/002 |
| 2018/0051621 | A1 * | 2/2018 | Yi | F01P 7/16 |

* cited by examiner

APPARATUS FOR CONTROLLING THE TEMPERATURE OF AN OIL COOLER IN A MOTOR VEHICLE

TECHNICAL FIELD

The invention relates to an apparatus for controlling the temperature of an oil cooler in a motor vehicle.

BACKGROUND

Apparatuses of the generic type are known, for example, from DE 103 46 195 B4 and DE 100 19 029 B4. For its intended purpose, an apparatus of this type is fixed on an oil cooler, in order to cool the oil in the internal combustion engine of a motor vehicle. In order to adapt the cooling performance of the apparatus to the current oil temperature, the temperature of a coolant which flows into the oil cooler is adapted by way of a thermostat valve. To this end, the thermostat valve has a warm inlet and a cold inlet. The cold inlet can be connected, for example, directly to a coolant outlet of a coolant cooler and can guide a relatively cold coolant into the thermostat valve. The warm inlet can be connected, for example, to a coolant outlet of the internal combustion engine and can guide a relatively warm coolant into the thermostat valve. The relatively cold coolant and the relatively warm coolant can be mixed with different proportions in the thermostat valve, in order to keep the oil in the oil cooler below a predefined temperature limit value and to make heating of the oil possible.

By way of the thermostat valve, the oil in the oil cooler is cooled as soon as the current oil temperature exceeds the predefined temperature limit value. As soon as the oil temperature undershoots the temperature limit value, said oil temperature is no longer regulated in the conventional apparatus. For this reason, the oil temperature and, as a consequence, also the viscosity of the oil in the oil cooler can differ considerably, which can lead to an increased fuel consumption and to a lower degree of efficiency of the internal combustion engine.

It is therefore the object of the invention to provide an apparatus of the generic type, in which the abovementioned disadvantages are avoided.

SUMMARY

According to the invention, said object is achieved by way of the subject matter of the independent claims. Advantageous embodiments are the subject matter of the dependent claims.

The present invention is based on the general concept of regulating the oil temperature by way of two limit values in an apparatus for controlling the temperature of an oil cooler in a motor vehicle. To this end, the apparatus has a temperature control arrangement with a cold thermostat with a limit operating temperature. The temperature control arrangement has a cold inlet for a coolant at a first temperature and a warm inlet for a coolant at a second temperature, the first temperature being lower than the second temperature. The temperature control arrangement also has a coolant outlet which can be fixed in a fluid-conducting manner to a coolant inlet of the oil cooler. According to the invention, the temperature control arrangement has a warm thermostat with a lower limit operating temperature, the warm thermostat being connected in a fluid-conducting manner to the cold thermostat.

In the apparatus according to the invention, the temperature of the coolant is regulated by way of the cold thermostat and the warm thermostat in such a way that the oil temperature in the oil cooler lies in a defined range between the limit operating temperature and the lower limit operating temperature. As a consequence, the oil temperature varies in the defined range even in the case of a changing operating power output of the internal combustion engine, as a result of which, overall, the fuel consumption of the internal combustion engine can be reduced considerably and the degree of efficiency of the internal combustion engine can be increased.

The coolant in the cold inlet and the coolant in the warm inlet have different temperatures. Here, according to the invention, the first temperature is lower than the second temperature of the coolant. The coolant at the first (lower) temperature can thus come, for example, from a coolant cooler, and the coolant at the second (higher) temperature can come, for example, from the internal combustion engine in a direct and uncooled manner. The first temperature and the second temperature can differ considerably, in order to make more rapid cooling or heating of the oil in the oil cooler possible.

It is advantageously provided that the cold thermostat and the warm thermostat have in each case one first fluid chamber and in each case one second fluid chamber. Here, the respective first fluid chamber is separated from the respective second fluid chamber by way of a separating piston. The respective first fluid chamber and the respective second fluid chamber can be connected in a fluid-tight or fluid-conducting manner by way of the respective separating piston. For example, the cold thermostat and the warm thermostat can in each case have a cylindrical interior space which is formed by way of the respective fluid chambers. The respective first fluid chamber can have a greater diameter than the respective second fluid chamber. Here, a diameter of the separating piston can be selected in such a way that a separating opening between the respective first fluid chamber and the respective second fluid chamber can be closed in a fluid-tight manner by way of the respective operating piston and, nevertheless, the separating piston forms a gap with a wall of the first fluid chamber. If the separating piston bears against the separating opening, the first fluid chamber is separated from the second fluid chamber in a fluid-tight manner. If, however, the separating piston is moved within the first fluid chamber away from the separating opening, the coolant can flow through the gap and the first fluid chamber is connected in a fluid-conducting manner to the second fluid chamber.

In order for it to be possible to move the separating piston in a manner which is dependent on the oil temperature in the cold thermostat or in the warm thermostat, it is advantageously provided that the cold thermostat and the warm thermostat have in each case one temperature-sensitive expansion element which is fixed on the respective separating piston. The expansion element can have, for example, a wax mixture which expands in each case above the limit operating temperature or above the lower limit operating temperature and, as a result, the respective separating piston is displaced in the respective first fluid chamber. The temperature sensitivity of the respective expansion element defines the limit operating temperature of the cold thermostat and the lower limit operating temperature of the warm thermostat.

It is advantageously provided in one development of the apparatus according to the invention that the first fluid chamber of the cold thermostat and the first fluid chamber of the warm thermostat are connected in a fluid-conducting manner among one another and to the coolant outlet. As soon as the coolant at the first (lower) temperature or the coolant at the second (higher) temperature is guided into the respective first fluid chamber from the cold inlet or from the warm inlet, the respective coolant flows in an unimpeded manner to the coolant outlet and further into the oil cooler. In this way, the temperature of the coolant in the apparatus can be regulated by way of the cold thermostat and the warm thermostat, and the oil temperature can thus be kept in a defined range between the limit operating temperature and the lower limit operating temperature.

It is advantageously provided that the warm inlet is connected in a communicating manner to the first fluid chamber of the warm thermostat. Here, the first fluid chamber is connected in a fluid-conducting manner to the coolant outlet below the lower limit operating temperature of the warm thermostat. It is also provided that the cold inlet is connected in a communicating manner to the second fluid chamber of the cold thermostat, the second fluid chamber of the cold thermostat being connected in a fluid-conducting manner to the coolant outlet above the limit operating temperature of the cold thermostat. The limit operating temperature of the cold thermostat and the lower limit operating temperature of the warmth can advantageously be different, and the limit operating temperature of the cold thermostat is preferably higher than the lower limit operating temperature of the warm thermostat.

During starting of a cold internal combustion engine, the oil temperature lies below the limit operating temperature of the cold thermostat and below the lower limit operating temperature of the warm thermostat. The first fluid chambers are connected in a fluid-conducting manner among one another and to the coolant outlet, and the second fluid chambers are separated in a fluid-tight manner from the respective first fluid chamber and therefore from the coolant outlet. The warm inlet is connected to the first fluid chamber of the warm thermostat, and the coolant at the second (higher) temperature can flow in an unimpeded manner to the coolant outlet. The cold inlet is connected to the second fluid chamber of the cold thermostat, with the result that the coolant at the first (lower) temperature is not connected to the coolant outlet. In this way, the coolant at the second (higher) temperature flows in the oil cooler and the oil is heated. As soon as the oil reaches the lower limit operating temperature of the warm thermostat, the separating piston is actuated by way of the expansion element in the warm thermostat and the first fluid chamber is closed. Here, the coolant outlet is separated in a fluid-tight manner from the warm inlet by way of the separating piston. The heating of the oil in the oil cooler is stopped. In this way, during starting of a cold internal combustion engine, the oil can be heated more rapidly to the lower limit operating temperature, as a result of which the operating temperature of the internal combustion engine is reached more rapidly.

As soon as the oil in the oil cooler reaches the limit operating temperature, the separating piston is actuated by way of the expansion element in the cold thermostat. The second fluid chamber of the cold thermostat is opened and is connected in a fluid-conducting manner to the first fluid chamber of the cold thermostat and thus to the coolant outlet. The oil in the oil cooler is cooled by way of the coolant at the first (lower) temperature. As soon as the oil temperature in the oil cooler falls below the limit operating temperature, the second fluid chamber is closed and the cooling of the oil is stopped. If the oil temperature falls further below the lower limit operating temperature, the first fluid chamber of the warm thermostat is opened and the oil is heated. The first fluid chamber is closed as soon as the lower limit operating temperature is reached.

In this way, during starting of a cold internal combustion engine, the oil can be heated more rapidly and, during the operation of the internal combustion engine, the oil temperature can be held in a defined range between the lower limit operating temperature and the limit operating temperature. As a result, overall, the degree of efficiency of the internal combustion engine can be increased and the fuel consumption can be reduced.

In order for it to be possible to monitor the current oil temperature in the oil cooler, it is advantageously provided that the temperature-sensitive expansion element of the cold thermostat and the temperature-sensitive expansion element of the warm thermostat are arranged at least in regions in an oil duct or in an oil chamber of the temperature control arrangement.

It is provided here that the oil chamber has an oil chamber inlet and an oil chamber outlet, it being possible for the oil chamber inlet and the oil chamber outlet to be connected in a fluid-conducting manner to the oil cooler. The oil chamber is therefore integrated into an oil passage in the oil cooler, with the result that a change in the oil temperature in the oil cooler can be sensed by way of the expansion elements which are arranged in the oil chamber.

It is advantageously provided that the oil duct has an oil duct outlet and an oil duct inlet, it being possible for the oil duct outlet to be connected in a fluid-conducting manner to an oil outlet of the oil cooler. Therefore, the oil outlet of the oil cooler can be extended by way of the oil duct, with the result that the oil which flows out of the oil cooler flows away through the oil duct of the temperature control arrangement. The respective expansion elements are fixed in the oil duct, with the result that the cooling or the heating of the oil in the oil cooler can be regulated directly by way of the current oil temperature. In this way, deviations can be avoided which can be produced during a measurement of the oil temperature within the oil cooler on account of the oil temperatures which differ within the oil cooler.

In order to fix the cold thermostat and the warm thermostat in the temperature control arrangement in a space-saving manner, it is advantageously provided that the cold thermostat and the warm thermostat are arranged in an identically directed manner in parallel or at an angle to one another. In this way, the expansion elements can be fixed on one side of the temperature control arrangement and can be arranged in a space-saving manner at least in regions in the oil duct or, as an alternative, in the oil chamber.

In order to connect the apparatus to a standard oil cooler, it is advantageously provided that the apparatus has an adapter plate with an oil passage and with a coolant passage, by way of which the temperature control arrangement and the oil cooler can be connected in a fluid-conducting manner. The oil passage is fixed on one side on the oil chamber outlet and on the oil chamber inlet or, as an alternative, on the oil duct inlet and on the other side on the oil outlet of the oil cooler. Accordingly, the coolant passage is fixed on one side on the coolant outlet and on the other side on the coolant inlet of the oil cooler. The adapter plate can be adapted in a manner which is dependent on the configuration of the oil cooler, with the result that a standardized temperature control arrangement can be fixed on a plurality of oil coolers.

In order to avoid a leak of the coolant or the oil in the apparatus, it is advantageously provided that the adapter plate has at least one oil passage seal and at least one coolant passage seal, by way of which the adapter plate can be sealed around the oil passage and around the coolant passage.

It is also provided that the temperature control arrangement has a housing with at least one through bore, and the adapter plate has at least one bore which corresponds with the respective through bore. By way of the at least one through bore and by way of the at least one corresponding bore, the temperature control arrangement can be fixed on the adapter plate and the adapter plate can be fixed on the oil cooler by way of at least one nut.

Overall, the oil temperature can be kept in a defined range between the lower limit operating temperature and the limit operating temperature by way of the apparatus according to the invention for controlling the temperature of an oil cooler in a motor vehicle. As a result, both the degree of efficiency of the internal combustion engine can be increased and the fuel consumption can be reduced. Furthermore, during starting of a cold internal combustion engine, the oil in the oil cooler can be heated more rapidly and, as a result, the operating temperature of the internal combustion engine can be reached more rapidly.

Further important features and advantages of the invention result from the subclaims, from the drawings and from the associated description of the figures using the drawings.

It goes without saying that the features which are mentioned in the above text and are still to be explained in the following text can be used not only in the respectively specified combination, but rather also in other combinations or on their own, without departing from the scope of the present invention.

Preferred exemplary embodiments of the invention are shown in the drawings and will be explained in greater detail in the following description, identical designations relating to identical or similar or functionally identical components.

DETAILED DESCRIPTION

Figure 1:
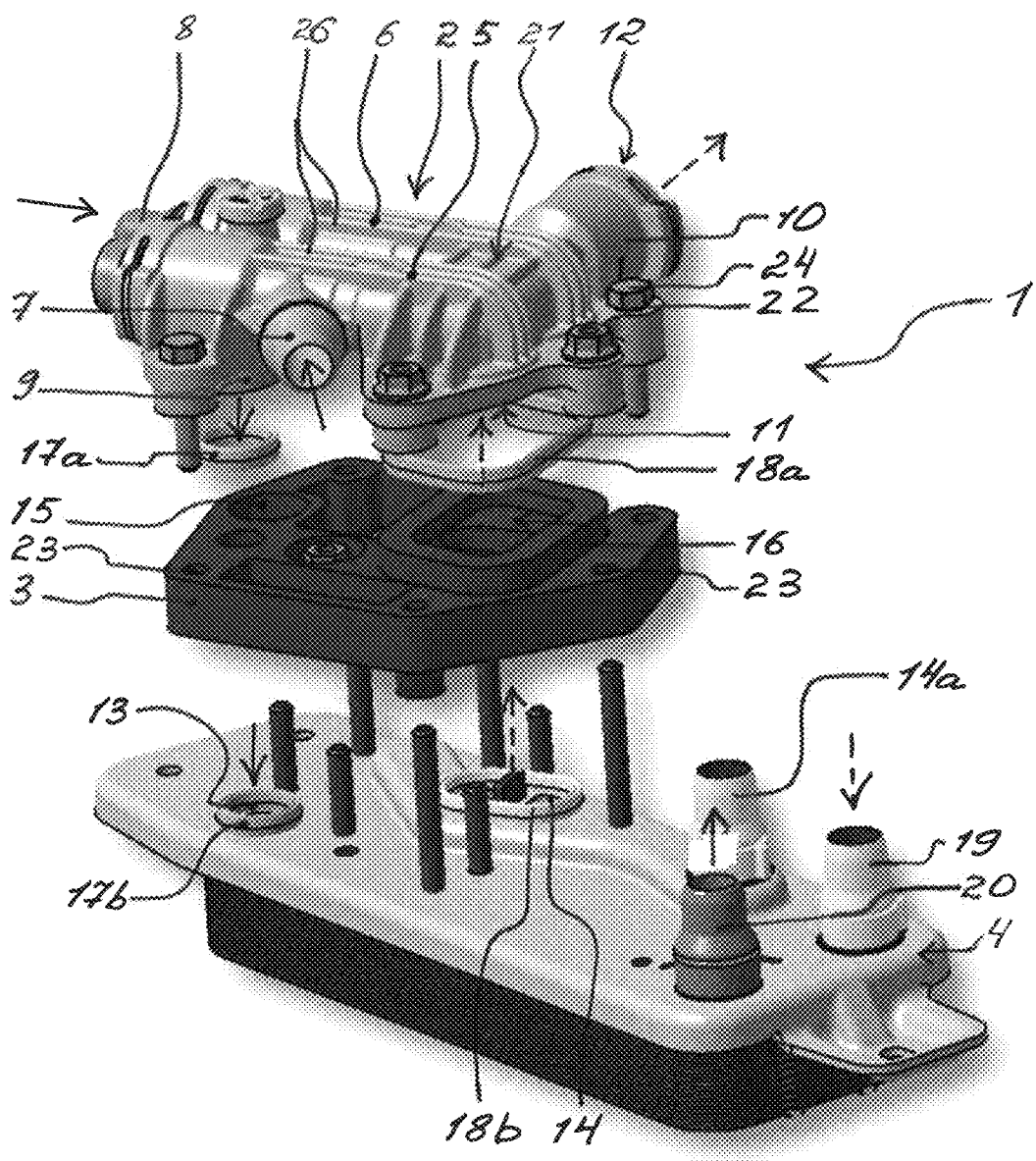
FIG. 1 shows an exploded view of an apparatus according to the invention and an oil cooler.

FIG. 1 diagrammatically shows an apparatus 1 according to the invention. The apparatus 1 has a temperature control arrangement 2 and an adapter plate 3, it being possible for the temperature control arrangement 2 to be fixed on an oil cooler 4 for by way of the adapter plate 3. Furthermore, the temperature control arrangement 2 has a cold thermostat 5 with a limit operating temperature and a warm thermostat 6 with a lower limit operating temperature. A coolant at a first temperature and a coolant at a second temperature flow through the temperature control arrangement 2, the first temperature being lower than the second temperature. As a consequence, a distinction is made between a relatively cold coolant and a relatively warm coolant for reasons of simplification. The temperature control arrangement 2 has a cold inlet 7 for the relatively cold coolant and a warm inlet 8 for the relatively warm coolant. The temperature control arrangement 2 also has a coolant outlet 9 and an oil duct 10 with an oil duct inlet 11 and with an oil duct outlet 12. Here, the coolant outlet 9 can be fixed on a coolant inlet 13 of the oil cooler 4, and the oil duct 10 can be fixed on an oil outlet 14 of the oil cooler 4. For improved comprehension, the coolant passage is indicated by way of solid arrows and the oil passage is indicated by way of interrupted arrows.

The temperature control arrangement 2 can be fixed on the oil cooler 4 by way of the adapter plate 3. The adapter plate 3 has a coolant passage 15 and an oil passage 16, by way of which the temperature control arrangement 2 and the oil cooler 4 can be connected in a fluid-conducting manner. The oil passage 16 is fixed on one side on the oil duct inlet 11 of the temperature control arrangement 2 and on the other side on the oil outlet 14 of the oil cooler 4. Accordingly, the coolant passage 15 is fixed on one side on the coolant outlet 9 of the temperature control arrangement 2 and on the other side on the coolant inlet 13 of the oil cooler 4. In order to avoid a leak of the coolant or the oil, the adapter plate 3 has oil passage seals 17*a* and 17*b* and coolant passage seals 18*a* and 18*b*, by way of which the adapter plate 3 is sealed on both sides around the oil passage 16 and around the coolant passage 15. The oil can be fed into the oil cooler 4 through an oil inlet 19, and the coolant can be discharged from the oil cooler through a coolant outlet 20.

In addition, the temperature control arrangement 2 has a housing 21 with a plurality of through bores 22 which correspond with bores 23 in the adapter plate 3. By way of the through bores 22 and the bores 23, the temperature control arrangement 2 can be fixed on the adapter plate 3, and the adapter plate 3 can be fixed on the oil cooler 4 for by way of nuts/screws 24. By way of the adapter plate 3, the temperature control arrangement 2 can be fixed on an oil cooler of any desired configuration, by the configuration of the adapter plate 3 being adapted to the configuration of the respective oil cooler. In the exemplary embodiment which is shown here, the oil cooler 4 for has, for example, a standard oil outlet 14*a* which has been replaced by the oil outlet 14.

Figure 2:
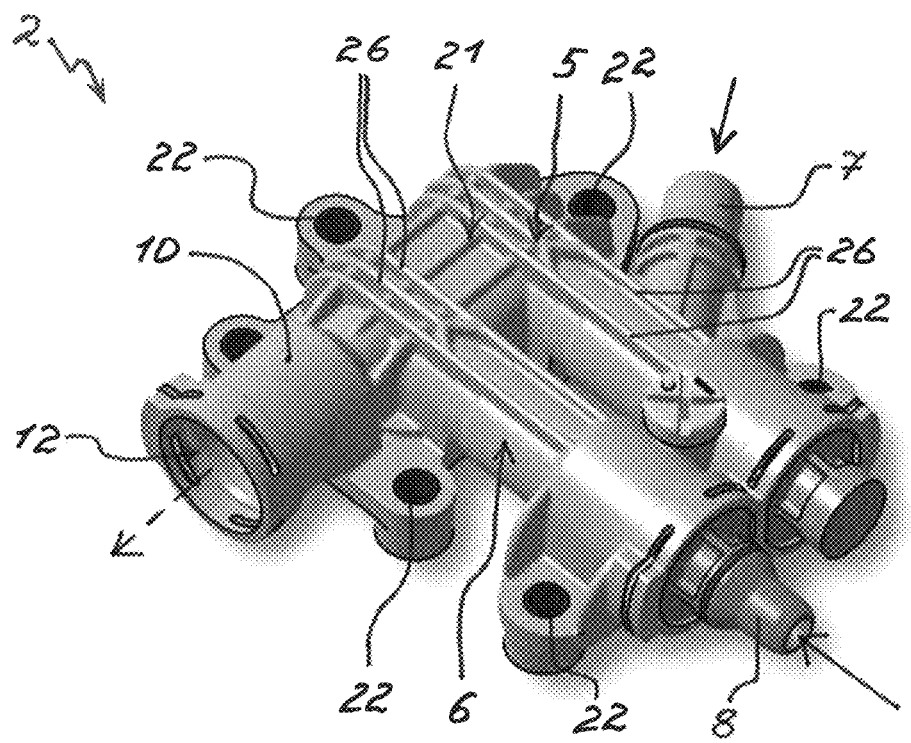
FIG. 2 shows a view from above of a temperature control arrangement.
Figure 3:
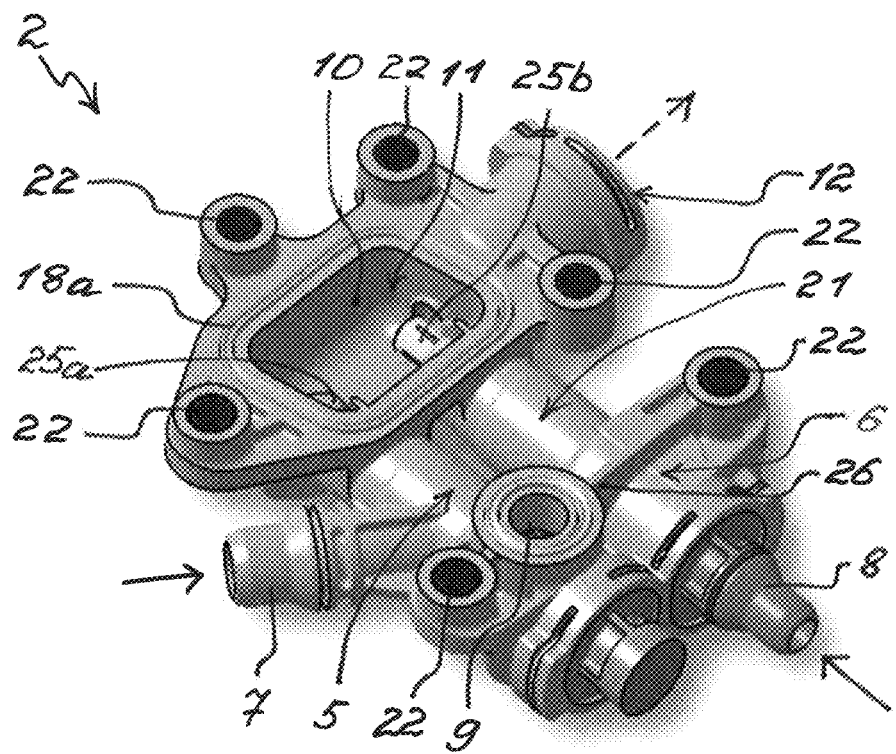
FIG. 3 shows a view from below of the temperature control arrangement which is shown in FIG. 2.

FIG. 2 and FIG. 3 diagrammatically show the temperature control arrangement 2 from above and from below. The temperature control arrangement 2 has the cold thermostat 5 and the warm thermostat 6 which are arranged in this exemplary embodiment in the housing 21 parallel to one another and in an identically directed manner. An expansion element 25*a* of the cold thermostat 5 and an expansion element 25*b* of the warm thermostat 6 are fixed in regions in the oil duct 10. In this way, the cooling or the heating of the oil in the oil cooler 4 can be regulated directly by way of the current oil temperature of the oil which flows out of the oil cooler 4. In order to reinforce the housing 21, the temperature control arrangement 2 has a plurality of reinforcing ribs 26. The rigidity of the temperature control arrangement 2 can be increased and the weight can be reduced by way of the reinforcing ribs 26.

Figure 4:
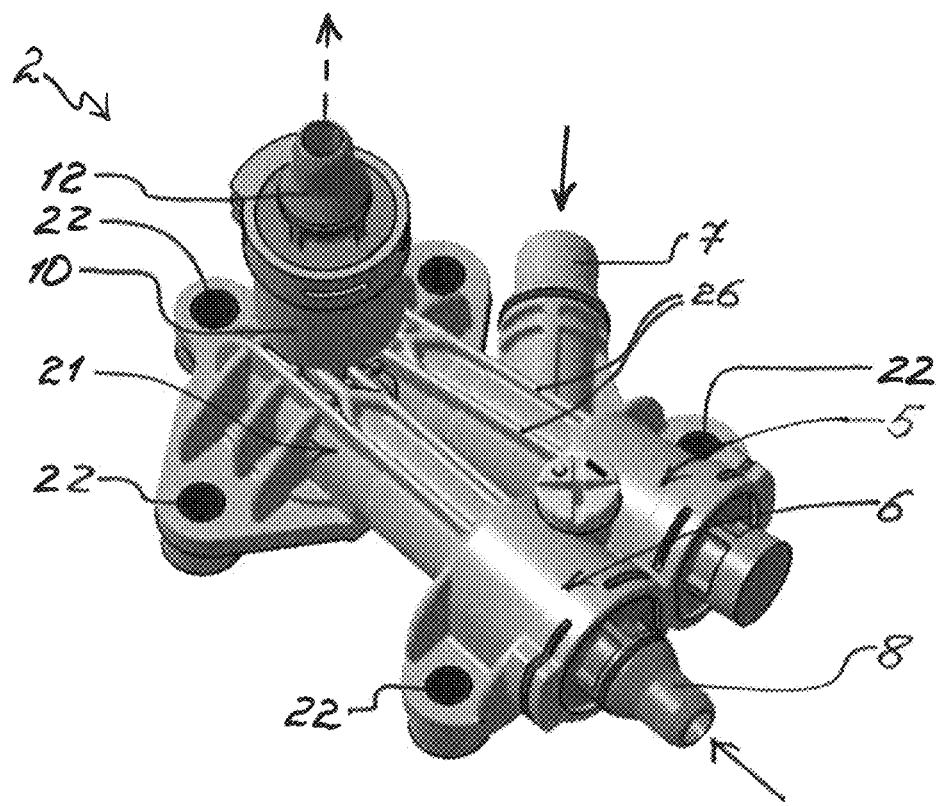
FIG. 4 shows a view from above of a temperature control arrangement of alternative configuration.
Figure 5:
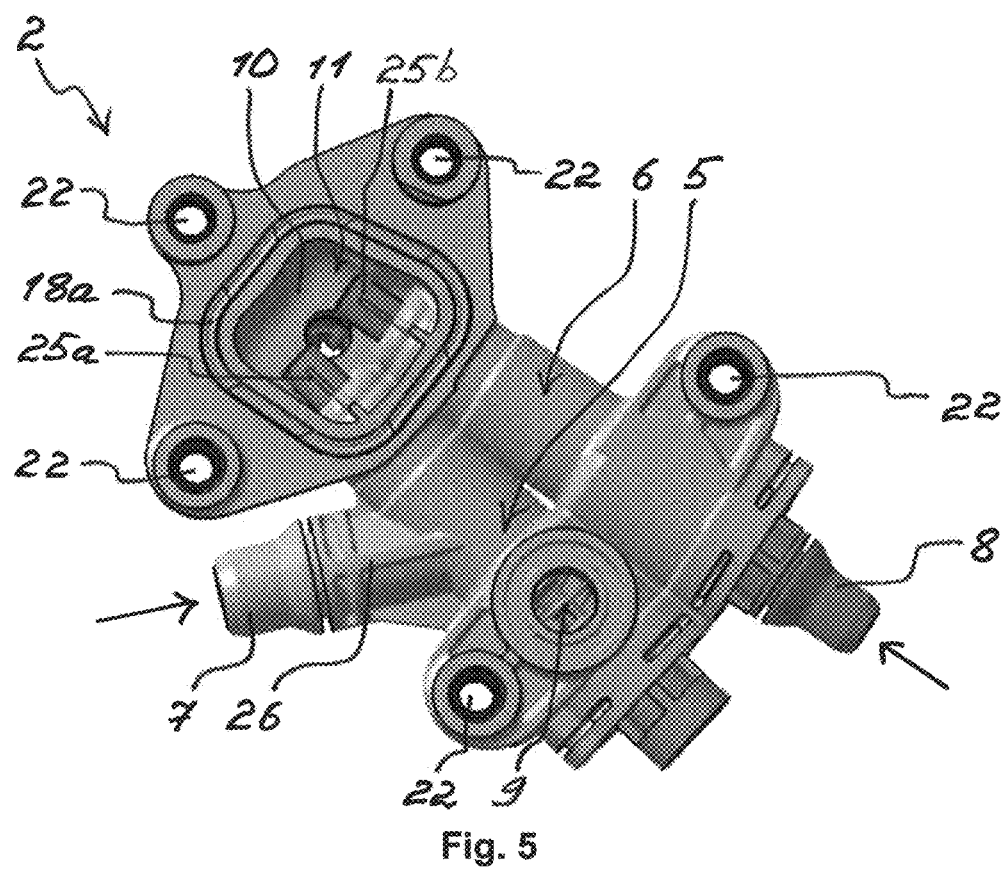
FIG. 5 shows a view from below of the temperature control arrangement which is shown in FIG. 4.

FIG. 4 and FIG. 5 diagrammatically show the temperature control arrangement 2 of alternative configuration from the top and from the bottom. In said exemplary embodiment, the cold thermostat 5 and the warm thermostat 6 are arranged at an acute angle to one another and in an identically directed manner, with the result that the expansion elements 25*a* and 25b are arranged on one side of the temperature control arrangement 2. In a deviation from FIG. 2 and FIG. 3, the oil duct outlet 12 is arranged on the housing 21 so as to face away from the oil cooler 4 in this exemplary embodiment. Here, the housing 21 also has a plurality of reinforcing ribs 26, in order to reduce the weight of the temperature control arrangement 2 and to increase the rigidity.

Figure 6:
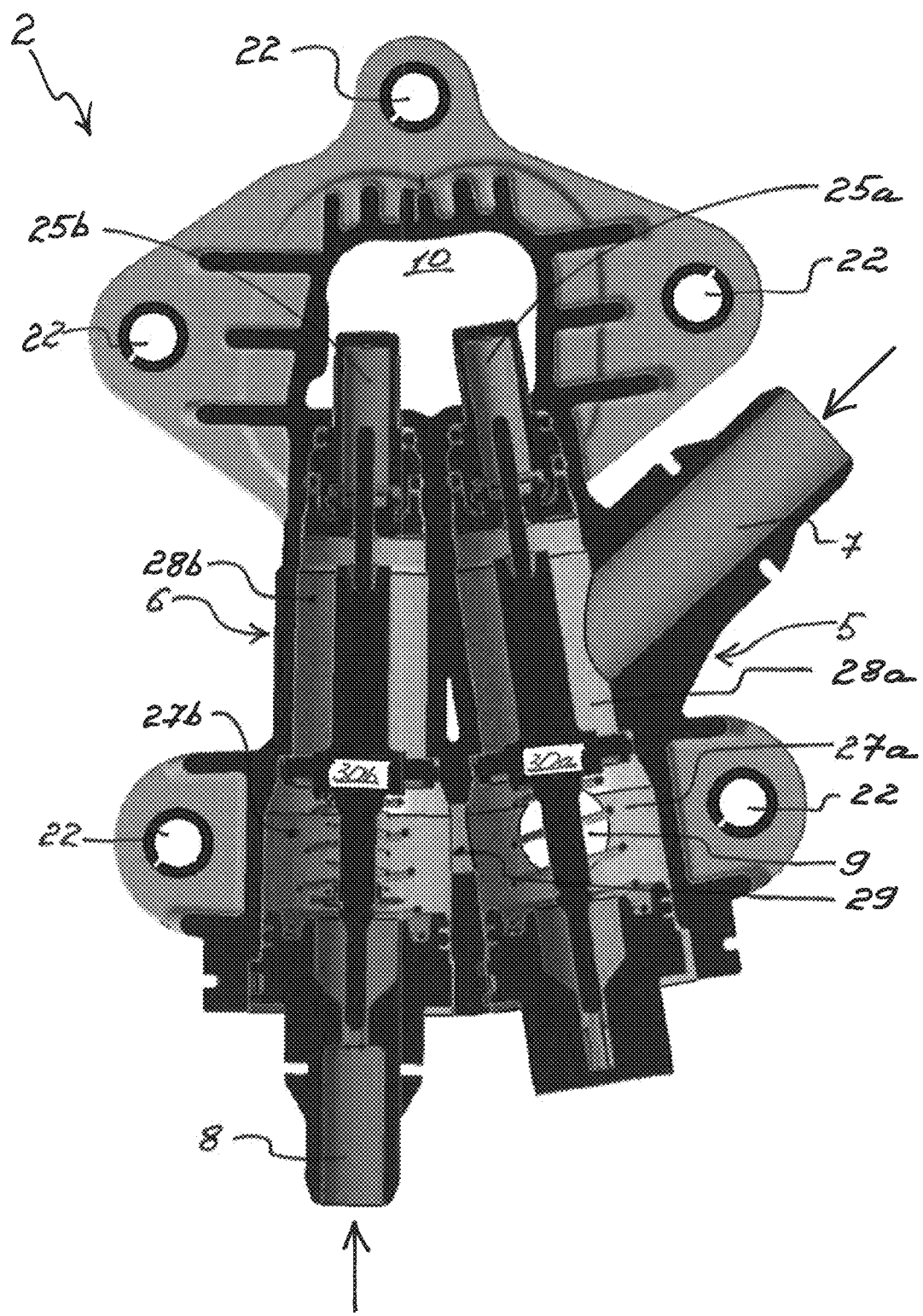
FIG. 6 shows a sectional view of the temperature control arrangement which is shown in FIG. 2 and FIG. 3.

FIG. 6 diagrammatically shows the temperature control arrangement 2 in section. The cold thermostat 5 has a first fluid chamber 27a and a second fluid chamber 28a, and the warm thermostat 6 has a first fluid chamber 27b and a second fluid chamber 28b. The respective first fluid chambers 27a and 27b are connected in a fluid-conducting manner among one another by way of a connecting chamber 29. The respective first fluid chamber 27a and 27b and the respective second fluid chamber 28a and 28b can be separated in a fluid-tight manner or connected in a fluid-conducting manner by way of in each case one separating piston 30a and 30b. Furthermore, the first fluid chamber 27b of the warm thermostat 6 can be separated in a fluid-tight manner from the warm inlet 8 by way of the separating piston 30b. Furthermore, the cold thermostat 5 and the warm thermostat 6 in each case have the temperature-sensitive expansion element 25a and 25b which is fixed on the respective separating piston 30a and 30b. The expansion elements 25a and 25b are arranged in regions in the oil duct 10 and expand in each case above the limit operating temperature or above the lower limit operating temperature. Here, the expansion elements 25a and 25b displace the respective separating piston 30a and 30b in the respective first fluid chamber 27a and 27b. The cold inlet 7 is connected in a fluid-conducting manner to the second fluid chamber 28b, and the warm inlet 8 is connected in a fluid-conducting manner to the first fluid chamber 27a. The coolant outlet 9 is fixed in the first fluid chamber 27a of the cold thermostat 5.

The lower limit operating temperature of the warm thermostat 6 and the limit operating temperature of the cold thermostat 5 are different, the limit operating temperature of the cold thermostat 5 being higher than the lower limit operating temperature of the warm thermostat 6. During starting of a cold internal combustion engine, the oil temperature lies below the limit operating temperature of the cold thermostat 5 and below the lower limit operating temperature of the warm thermostat 6. As shown here, at said oil temperature, the respective first fluid chamber 27a and 27b is connected in a fluid-conducting manner to the coolant outlet 9, and the respective second fluid chamber 28a and 28b is separated in a fluid-tight manner from the coolant outlet 9 by way of the respective separating piston 30a and 30b. The relatively warm coolant flows from the warm inlet 8 in an unimpeded manner to the coolant outlet 9, and the cold inlet 7 with the relatively cold coolant remains separated in a fluid-tight manner from the coolant outlet 9. The oil in the oil cooler 4 is heated by way of the relatively warm coolant.

As soon as the oil temperature in the oil cooler 4 reaches the lower limit operating temperature of the warm thermostat 6, the separating piston 30b separates the first fluid chamber 27b from the warm inlet 8 in a fluid-tight manner. The heat exchange between the oil and the relatively warm coolant is interrupted. When the oil in the oil cooler 4 reaches the limit operating temperature of the cold thermostat 5, the separating piston 30a opens the second fluid chamber 28a of the cold thermostat 5. The relatively cold coolant flows from the cold inlet 7 to the coolant outlet 9, and the oil in the oil cooler 4 is cooled. If the temperature in the oil cooler 4 reaches the limit operating temperature of the cold thermostat 5, the second fluid chamber 28a is closed and the cooling of the oil is stopped. If the oil temperature falls further below the lower limit operating temperature of the warm thermostat 6, the first fluid chamber 27b of the warm thermostat 6 is opened and the oil is heated.

In this way, during starting of a cold internal combustion engine, the oil in the oil cooler 4 can be heated rapidly and can be kept between the lower limit operating temperature and the limit operating temperature.

Figure 7:
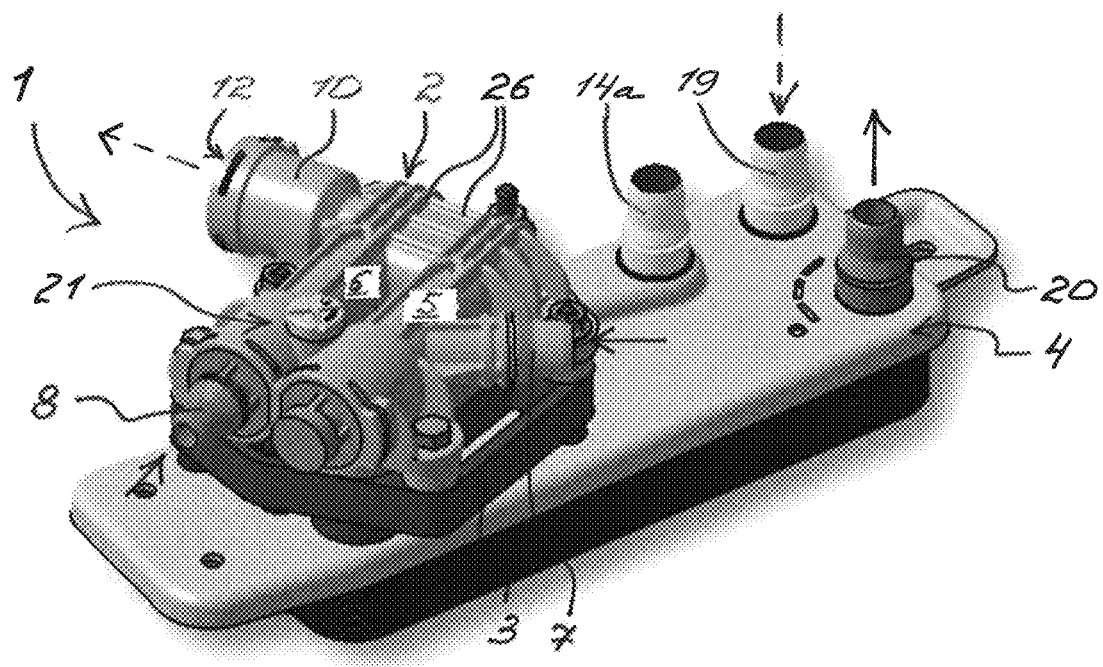
FIG. 7 shows a view of an apparatus according to the invention on an oil cooler.
Figure 8:
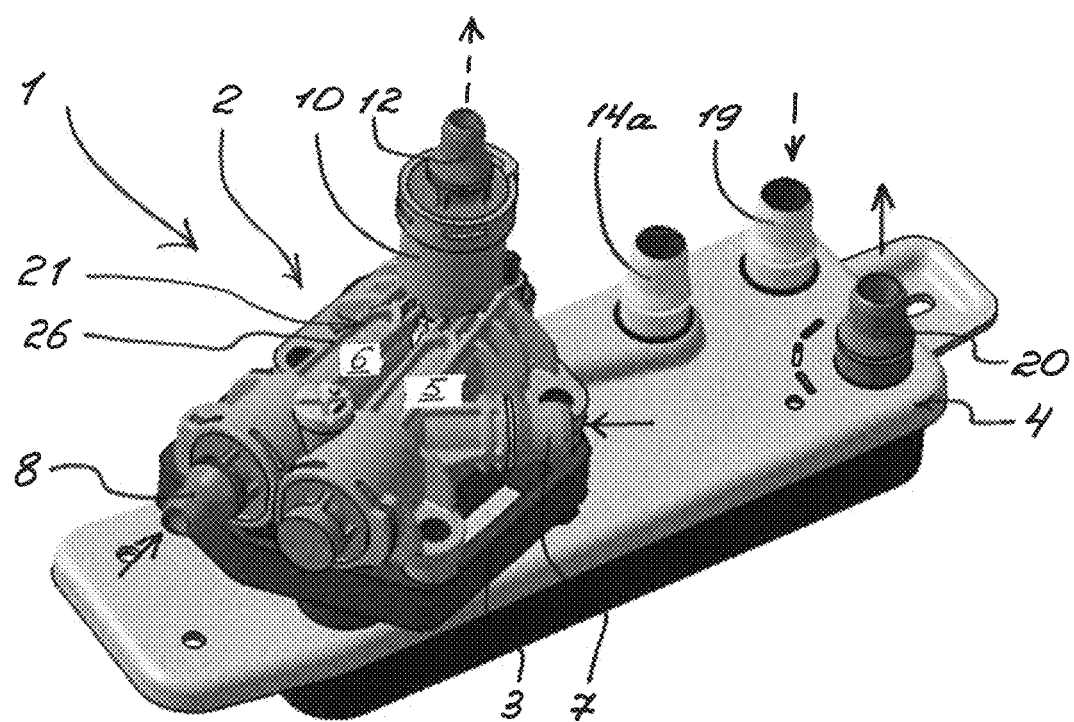
FIG. 8 shows a view of an apparatus according to the invention with a temperature control arrangement of alternative configuration on an oil cooler.

FIG. 7 diagrammatically shows the apparatus 1 according to the invention with the temperature control arrangement 2 and with the adapter plate 3 which is fixed on the oil cooler 4. FIG. 8 shows the apparatus 1 with the temperature control arrangement 2 of alternative configuration. By way of the adapter plate 3, the temperature control arrangement 2 can be fixed on an oil cooler of any desired configuration, by the configuration of the adapter plate 3 being adapted to the configuration of the respective oil cooler. In the exemplary embodiments which are shown here, the oil cooler 4 has, for example, an oil outlet 14a which has been replaced by the oil outlet 14.

Overall, the oil temperature can be held in a defined range between the lower limit operating temperature and the limit operating temperature by way of the apparatus 1 according to the invention for controlling the temperature of the oil cooler 4. As a result, the degree of efficiency of the internal combustion engine can be increased, and the fuel consumption in the internal combustion engine can be reduced. Furthermore, during starting of a cold internal combustion engine, the oil in the oil cooler 4 can be heated more rapidly and, as a result, the operating temperature of the internal combustion engine can be reached more rapidly.

What is claimed is:

1. An apparatus for controlling the temperature of an oil cooler in a motor vehicle, comprising a temperature control arrangement including:
    a cold thermostat with a limit operating temperature;
    a cold inlet for a coolant at a first temperature and a warm inlet for a coolant at a second temperature, the first temperature being lower than the second temperature;
    a coolant outlet fixable in a fluid-conducting manner to a coolant inlet of the oil cooler; and
    a warm thermostat with a limit operating temperature, the warm thermostat being connected in a fluid-conducting manner to the cold thermostat;
    wherein the cold thermostat and the warm thermostat each has a first fluid chamber, a second fluid chamber, and a separating piston that separates the first fluid chamber from the second fluid chamber; and
    wherein the warm inlet is connected in a communicating manner to the first fluid chamber of the warm thermostat, the first fluid chamber of the warm thermostat being connected in a fluid-conducting manner to the coolant outlet below the limit operating temperature of the warm thermostat.

2. The apparatus as claimed in claim 1, wherein the cold thermostat and the warm thermostat each has a temperature-sensitive expansion element fixed on the respective separating piston and configured to displace the respective separating piston in the respective first fluid chamber.

3. The apparatus as claimed in claim 2, wherein the temperature-sensitive expansion element of the cold thermostat and the temperature-sensitive expansion element of the warm thermostat are arranged at least in regions in one of an oil duct and an oil chamber of the temperature control arrangement.

4. The apparatus as claimed in claim 3, wherein the oil duct has an oil duct inlet and an oil duct outlet, the oil duct inlet being connectable in a fluid-conducting manner to an oil outlet of the oil cooler.

5. The apparatus as claimed in claim 3, wherein the oil chamber has an oil chamber outlet and an oil chamber inlet, the oil chamber inlet and the oil chamber outlet being connectable in a fluid-conducting manner to the oil cooler.

6. The apparatus as claimed in claim 1, wherein the first fluid chamber of the cold thermostat and the first fluid chamber of the warm thermostat are connectable in a fluid-conducting manner among one another and to the coolant outlet.

7. The apparatus as claimed in claim 1, wherein the cold inlet is connected in a communicating manner to the second fluid chamber of the cold thermostat, the second fluid chamber of the cold thermostat being connected in a fluid-conducting manner to the coolant outlet above the limit operating temperature of the cold thermostat.

8. The apparatus as claimed in claim 1, wherein the limit operating temperature of the cold thermostat and the limit operating temperature of the warm thermostat are different.

9. The apparatus as claimed in claim 8, wherein the limit operating temperature of the cold thermostat is higher than the limit operating temperature of the warm thermostat.

10. The apparatus as claimed in claim 1, wherein the cold thermostat and the warm thermostat are identically arranged in the temperature control arrangement in parallel or at an angle to one another.

11. The apparatus as claimed in claim 10, wherein the cold thermostat and the warm thermostat are arranged in the temperature control arrangement at an acute angle to one another.

12. The apparatus as claimed in claim 1, further comprising an adapter plate with a coolant passage and an oil passage, by way of which the temperature control arrangement and the oil cooler are connectable in a fluid-conducting manner.

13. The apparatus as claimed in claim 12, wherein the adapter plate has at least one oil passage seal and at least one coolant passage seal, by way of which the adapter plate is sealable around the coolant passage and around the oil passage.

14. The apparatus as claimed in claim 12, wherein the temperature control arrangement has a housing with at least one through bore, wherein the adapter plate has at least one bore corresponding with the at least one through bore of the housing and by way of which the temperature control arrangement is fixable on the adapter plate, and wherein the adapter plate is fixable on the oil cooler by way of at least one nut or screw.

15. An apparatus for controlling the temperature of an oil cooler in a motor vehicle, comprising:
   a temperature control arrangement including:
   a cold thermostat with a limit operating temperature;
   a warm thermostat with a limit operating temperature, the warm thermostat being connected in a fluid-conducting manner to the cold thermostat;
   a cold inlet for a coolant at a first temperature and a warm inlet for a coolant at a second temperature, the first temperature being lower than the second temperature; and
   a coolant outlet fixable in a fluid-conducting manner to a coolant inlet of the oil cooler; and
   an adapter plate with a coolant passage and an oil passage, by way of which the temperature control arrangement and the oil cooler are connectable in a fluid-conducting manner;
   wherein the cold thermostat and the warm thermostat each has a first fluid chamber, a second fluid chamber, and a separating piston that separates the first fluid chamber from the second fluid chamber; and
   wherein the warm inlet is connected in a communicating manner to the first fluid chamber of the warm thermostat, the first fluid chamber of the warm thermostat being connected in a fluid-conducting manner to the coolant outlet below the limit operating temperature of the warm thermostat.

16. The apparatus as claimed in claim 15, wherein the cold thermostat and the warm thermostat each has a temperature-sensitive expansion element fixed on the respective separating piston and configured to displace the respective separating piston in the respective first fluid chamber.

17. The apparatus as claimed in claim 16, wherein the temperature-sensitive expansion element of the cold thermostat and the temperature-sensitive expansion element of the warm thermostat are arranged at least in regions in one of an oil duct and an oil chamber of the temperature control arrangement.

18. The apparatus as claimed in claim 15, wherein the adapter plate has at least one oil passage seal and at least one coolant passage seal, by way of which the adapter plate is sealable around the coolant passage and around the oil passage.

* * * * *